July 21, 1953  E. MOREHOUSE  2,645,834
SAFETY CATCH
Filed Jan. 16, 1952
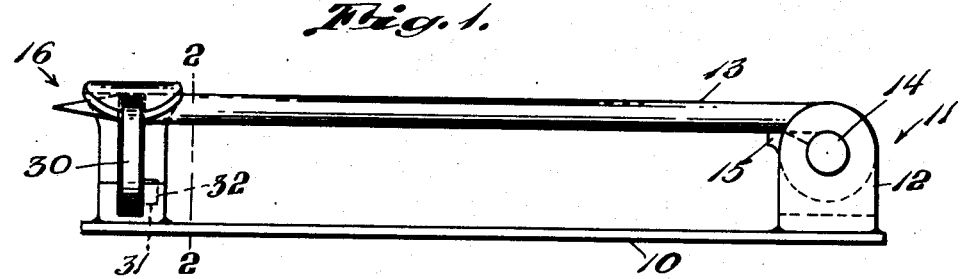
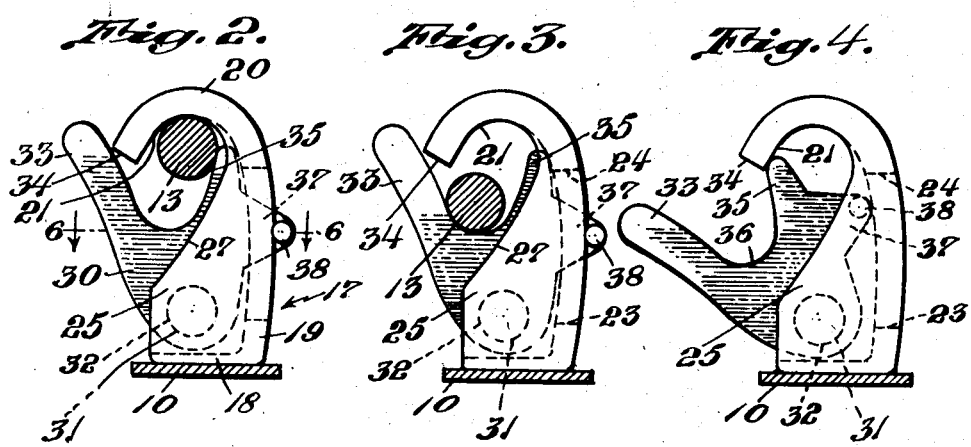
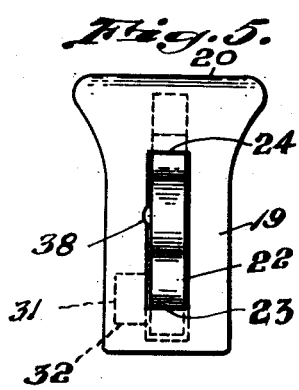
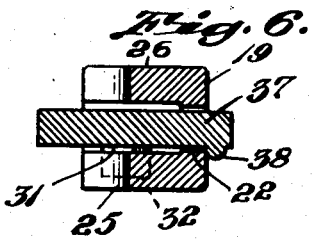
INVENTOR.
Eugene Morehouse
BY
Barlow & Barlow
ATTORNEYS.

Patented July 21, 1953

2,645,834

UNITED STATES PATENT OFFICE 2,645,834

SAFETY CATCH

Eugene Morehouse, Providence, R. I., assignor to B. A. Ballou & Co., Incorporated, a corporation of Rhode Island Application January 16, 1952, Serial No. 266,705

4 Claims. (Cl. 24—157)

This invention relates to a safety catch which is used for preventing a pin stem from becoming disengaged from a catch which receives the same.

Safety catches are necessarily of a rather small size and are so located that it is difficult because of their small size to operate the same. In some types of safety catches, the pin stem is utilized for manipulating the catch for easy operation, and the present safety catch is of that type.

One of the objects of this invention is to provide a guard which will close the hook of the catch with some means for locking the guard against accidental opening.

Another object of this invention is to utilize the shank of the hook for guiding the guard to closed position and there locking it.

Another object of this invention is to movably position the guard and then limit the movement which it may have in both directions.

With these and other objects in view, the invention consists of certain novel features of construction as will be more fully described and particularly pointed out in the appended claims.

In the accompanying drawings:

Figure 1 is an elevation showing the pin stem and its joint and the safety catch which is the subject of this invention both mounted on a common support;

Figure 2 is a sectional view on line 2—2 of Figure 1;

Figure 3 is a sectional view showing the pin stem in a different position from that shown in Figure 2;

Figure 4 is a view similar to Figures 2 and 3 but showing the guard in open position when the pin stem has been discharged therefrom;

Figure 5 is a rear view looking at the opposite side of the catch from that shown in Figure 1 and on an enlarged scale; and Figure 6 is a sectional view on line 6—6 of Figure 2.

In proceeding with this invention, I have provided a catch which has a base with a shank rising from the base and which shank terminates in a hook. The shank is slotted along its back, and a guard is pivoted in the body adjacent the base, which guard is provided with an arm which will swing so as to close the hook or which may swing to open position so that the pin stem may be discharged from beneath the hook. A second arm is so related to the first arm that it forms a limit or stop for the opening movement of the guard and also serves to push the pin stem from position beneath the hook or serves as a means for moving the guard to close the entrance to the hook, thus making the pin stem manipulatable to close or open the guard as occasion may require.

With reference to the drawings 10 designates an article base upon which both the pin stem joint and catch are mounted. This may be a unit bar upon which some ornament may be assembled. The pin stem joint designated generally 11 comprises a pair of ears 12 between which the pin stem 13 is pivoted upon the pivot pin 14. A suitable abutment 15 may be provided to limit the counterclockwise swinging movement of the pin stem, requiring it to be bent slightly when engaging the catch.

The catch is designated generally 16 and comprises a body portion designated generally 17 having a base 18 soldered to the bar 10 and a shank 19 extending upwardly from this base to support a hook 20 at its upper end having a concave downwardly facing curved retaining portion 21 of the hook 20. This shank is provided with a slot 22 extending lengthwise thereof terminating at the opposite ends 23 and 24 as shown in Figures 2, 3, and 4. Side walls 25 and 26 of the body extend from the shank forwardly and are cut on an angle as at 27 so as to merge into the hook.

A guard 30 is provided with a trunnion 31 which is pivotally mounted in a recess 32 in the side wall 25 of the body and is shaped as is best shown in Figures 2, 3, and 4 so as to have an arm 33 which will swing and engage the free end 34 of the hook and close the hook, while it has a second arm 35 which will engage the inner surface 21 of the hook and limit the opening movement of the guard as shown in Figure 4. These arms are arranged in generally V shape so that they diverge from each other with a rounded portion connecting the two arms as at 36 curved so as to receive the pin stem 13 therein as shown in Figure 3.

The pin stem being under an inherent tendency to rise due to its being sprung over the abutment 15, will move into the top of the concave arc 21 of the hook 20 as shown in Figure 2 and by reason of its engaging the second arm 35 will tend to hold arm 33 in a position to close the hook. However, in order to assure the guard being held in this closed position, I have provided a finger 37 which is of the same piece of stock as the guard, which finger is so located that it will pass through the slot 22 as shown in Figure 6 when the guard is in closed position. A detent 38 on one side of the finger will be rounded so as to cam and spread apart the opposite side walls of the long slot 22, spreading it sufficiently so that this detent may pass through the slot, after which the walls of the slot will again return and the detent will, as shown in Figure 6, be in a position to hold the guard closed.

If it is desired to open the guard, the pin stem 13 will be moved into the position shown in Figure 3 and then by forcing the pin stem against the arm 33, the arm may be swung about its pivot to the position shown in Figure 4, causing the detent 38 to be passed through the slot by forcing the side walls of the slot apart. In this position the detent will have passed completely through the slot as shown in Figure 4 and thus will serve to assist in maintaining the guard in open position as shown in Figure 4 until it is again engaged and moved to closed position.

The opening movement is limited by reason of the arm 35 engaging the hook as shown in Figure 4. It will, of course, be apparent that in order to move the guard to closed position, the pin stem will be moved into the guard as shown in Figure 4 between the two arms and then the pin stem pushed against the arm 35 so as to swing the guard to the position shown in Figure 2.

By this arrangement the pin stem may be used to manipulate the guard from closed to open position or vice versa, and the guard will be maintained in either open or closed position by reason of the finger and detent which requires additional force in order to move it from one position to the other, thus causing the guard to be maintained in either of these positions desired.

I claim:

1. In a safety catch, a body having a base, a shank extending away from the base and supporting a hook with its concave inner surface toward the base, said shank having a slot, a guard pivoted in the body having an arm to close the hook in one position or swing outwardly therefrom in another position, said guard having a finger positioned to pass through the slot with a detent to engage the outside edge of the shank and hold the arm against the hook thereby closing the catch.

2. In a safety catch as in claim 1 wherein the arm engages the end of the hook to limit closing movement of the guard.

3. In a safety catch as in claim 1 wherein said guard has a pair of arms in diverging relation, the hook closing arm of which engages the outer end of the hook when the guard is in closed position to limit movement of the guard in one direction and the other arm of which engages the inner surface of the hook to limit opening movement.

4. In a safety catch as in claim 3 wherein the detent will be on the inside of the shank when the guard is in open position and adjacent the edge of the slot when the second arm engages the inner surface of the hook.

EUGENE MOREHOUSE.

References Cited in the file of this patent

UNITED STATES PATENTS

| Number | Name | Date |
|---|---|---|
| 628,619 | Alwood | July 11, 1899 |
| 927,827 | Burgess | July 13, 1909 |
| 1,262,537 | Massa | Apr. 9, 1918 |
| 1,541,991 | Moody | June 16, 1925 |

FOREIGN PATENTS

| Number | Country | Date |
|---|---|---|
| 289,393 | Great Britain | of 1928 |